United States Patent
Cardot

(10) Patent No.: US 7,846,611 B2
(45) Date of Patent: Dec. 7, 2010

(54) MINIATURE FUEL CELL CORE

(75) Inventor: Francis Cardot, Neuchâtel (CH)

(73) Assignee: CSEM Centre Suisse d'Electronique et de Microtechniques SA - Recherche et Développement of Neuchatel, Switzerland, La Chaux-De-Fonds (CH)

( * ) Notice: Subject to any disclaimer, the term of this patent is extended or adjusted under 35 U.S.C. 154(b) by 1009 days.

(21) Appl. No.: 11/630,098

(22) PCT Filed: Jun. 23, 2005

(86) PCT No.: PCT/EP2005/052934

§ 371 (c)(1),
(2), (4) Date: Dec. 19, 2006

(87) PCT Pub. No.: WO2006/003108

PCT Pub. Date: Jan. 12, 2006

(65) Prior Publication Data

US 2008/0032175 A1    Feb. 7, 2008

(30) Foreign Application Priority Data

Jul. 6, 2004    (EP) .................................. 04405424

(51) Int. Cl.
*H01M 8/00*    (2006.01)
*H01M 2/04*    (2006.01)
*B05D 1/00*    (2006.01)

(52) U.S. Cl. ...................... 429/508; 429/517; 429/535; 427/115

(58) Field of Classification Search .................. None
See application file for complete search history.

(56) References Cited

U.S. PATENT DOCUMENTS

| | | | |
|---|---|---|---|
| 5,989,741 A * | 11/1999 | Bloomfield et al. | ........... 429/32 |
| 2004/0058220 A1 | 3/2004 | Liu et al. | |
| 2004/0081878 A1 | 4/2004 | Mardilovich et al. | |
| 2004/0115507 A1 | 6/2004 | Potter et al. | |

FOREIGN PATENT DOCUMENTS

| | | |
|---|---|---|
| EP | 1 258 937 A1 | 11/2002 |
| EP | 1 562 243 A1 | 2/2004 |
| FR | 2 857 162 A1 | 7/2003 |

OTHER PUBLICATIONS

Search Report From Corresponding European Application EP 04 40 5424.
Patent Abstracts of Japan From European Patent Office; Pub 05174878 Published Jul. 13, 1993, Fujitsu Ltd.

\* cited by examiner

*Primary Examiner*—Robert Hodge
(74) *Attorney, Agent, or Firm*—Townsend M. Belser, Jr.; Nexsen Pruet, LLC

(57) ABSTRACT

A method for producing a fuel cell core including: providing two identical subassemblies each including a substrate and a current collector removably arranged thereon, depositing an ionic liquid or pasty polymerizable membrane on at least one of the subassemblies in such a way that the collector thereof is completely covered, applying the subassemblies one against the other so as to obtain an assembly having a solidified membrane with the two collectors incorporated, face to face, in this membrane, and detaching the two substrates from the collectors.

10 Claims, 3 Drawing Sheets

MINIATURE FUEL CELL CORE

TECHNICAL FIELD

The present invention relates to the field of fuel cells. It relates, more particularly, to a method for producing a miniature cell core. It also relates to a cell core and a cell obtained by this method.

BACKGROUND

A fuel cell is described in document FR 03 07 967. It consists of a large number of elementary cells disposed in series and each having a stack comprising, as shown diagrammatically in FIG. 1, an anode 13a and a cathode 13b separated by an electrolytic membrane 10. The stack is positioned between two current collecting plates 11 and 12 through a diffuser (14a and 14b).

The patent application EP 04 405063.1 presents a method according to which the current collector is made by galvanic deposition on a substrate and then transferred onto the membrane so as to be held there by being inlaid or by adhesive bonding.

SUMMARY OF THE INVENTION

An object of the present invention is to provide a method enabling the core of a fuel cell to be further miniaturized and enabling the performance to be improved and production costs to be reduced.

More precisely, the invention relates to a method for producing a fuel cell core that may comprise the following operations in sequence:
  providing two identical subassemblies formed of a substrate and a current collector positioned on it in a detachable manner,
  depositing a polymerizable ionic membrane in the liquid or pasty state on at least one of said subassemblies so as to cover its collector completely,
  applying the two subassemblies obtained one against the other so as to obtain an assembly comprising a solidified membrane with the two collectors incorporated, face to face, in this membrane, and
  detaching the two substrates from the collectors.

The collectors may be either formed in situ on their substrate or formed separately and then added to their substrate.

According to a first embodiment of the invention, a membrane may be deposited on the two subassemblies.

According to a second embodiment of the invention, a membrane may be deposited on only one of the two subassemblies.

The invention also relates to a fuel cell core made by the above method wherein the assembly obtained is inserted between two rigid frames in the manner of a transparency.

Finally, the invention relates to a fuel cell of which the core is made by the above method and wherein the assembly obtained may be inserted between two rigid covers provided with connecting end pieces and providing, either side of the assembly, spaces for necessary reagents.

Advantageously, the frames and covers may also serve as supports for electrical contacts connecting the two collectors to the outside.

BRIEF DESCRIPTION OF THE DRAWINGS

Other features of the invention will become apparent subsequently on reading the following description, made with regard to the appended drawings in which.

DETAILED DESCRIPTION

Figure 2:
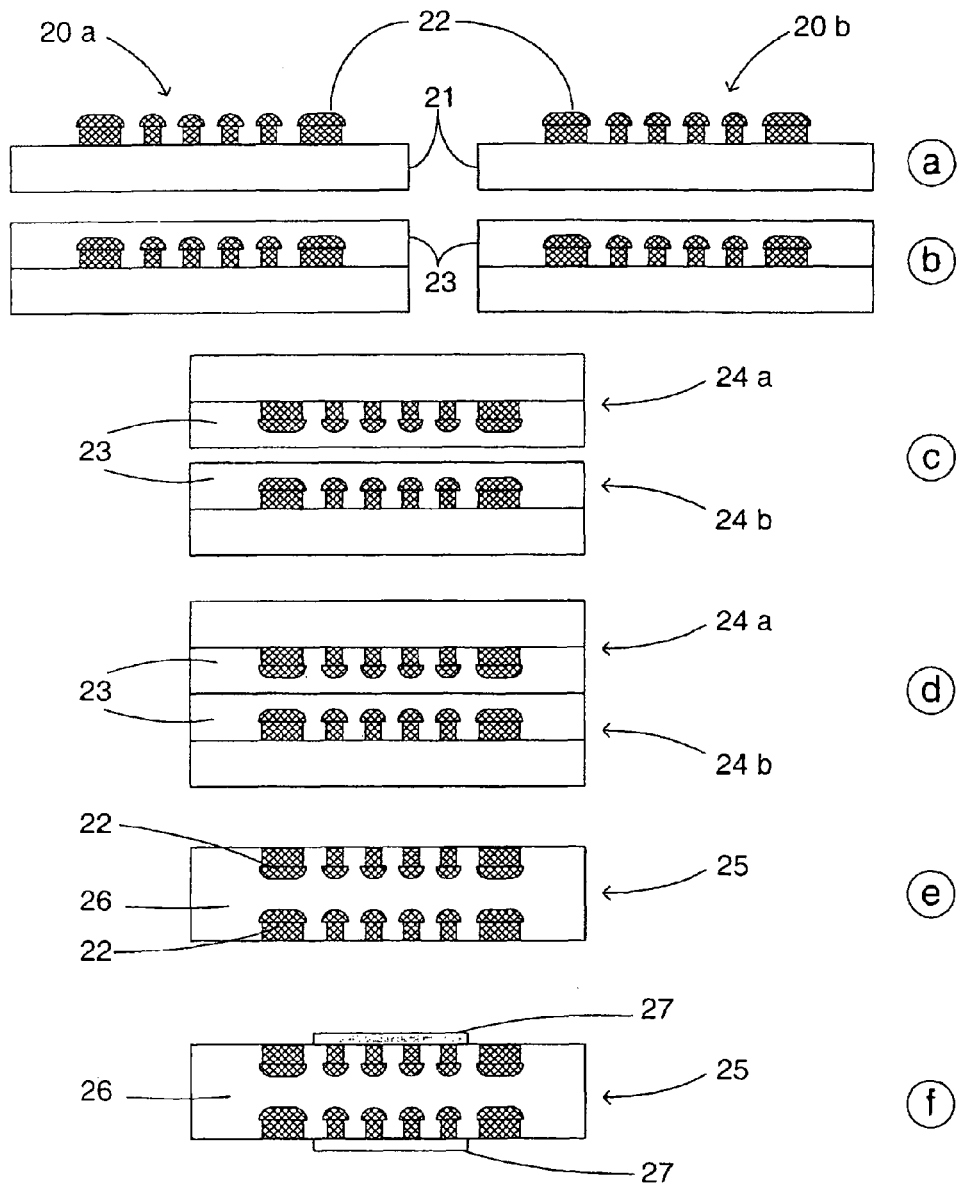
FIG. 2 and FIG. 3 illustrate two different ways of implementing the method.

Reference will first of all be made to FIG. 2 which shows diagrammatically the main operating principles of a first exemplary embodiment of the invention.

FIG. 2a

At the start of the method, two identical subassemblies 20a-20b are provided, each formed of a substrate 21 and a metal current collector in the form of a mesh 22 deposited on the substrate. The collector may have, in section, a mushroom or harpoon profile and, typically, a thickness of 5 to 10 µm. The face of the substrate which receives the collector may be such that it can be detached therefrom by mechanical, chemical or thermal action.

Each collector 22 may advantageously be made in situ by galvanic deposition of gold with the aid of a mask formed on the substrate according to the method described in detail in document EP 04 405063.1 already mentioned.

As a variant, collectors 22 could also be made separately and then added to the substrates and fixed to these by adhesive bonding.

FIG. 2b

A polymerizable ionic semi-membrane of the Nafion® (cationic) or of the ADP-Morgane® (anionic) type is deposited in the liquid or pasty state on each subassembly 20a-20b so as to cover collectors 22 completely. Typically, this layer may be spread out by a technique known by the name of "spin coating" and may have a thickness of 10 to 20 µm.

FIG. 2c

After prepolymerization of semi-membranes 23, an operation which is not indispensable, resulting subassemblies 24a-24b may be fixed respectively on the work plates of a machine, called "flip chip bonding" machine, not shown in the drawing, and well known to a person skilled in the art, two semi-membranes 23 facing each other.

FIG. 2d

The alignment and flatness of two subassemblies 24a-24b having preferably been adjusted, they are applied one against the other by the machine under pressure at a temperature and for a period such that semi-membranes 23 are welded to each other and solidified by polymerization.

FIG. 2e

When the two plates of the machine are separated, collectors 22 have to be detached from their respective substrates 21. In the case of collectors formed galvanically, separation may be made by a simple mechanical action. If the collectors have been brought together and fixed by adhesive bonding, separation may be made by chemical and/or thermal action.

The result is an assembly 25 comprising a solidified membrane 26 and two collectors 22 incorporated, face to face, in the membrane. Typically, the assembly may have a thickness of 20 to 40 µm.

FIG. 2f

The two faces of assembly 25 may be covered, above collectors 22, with a catalyst layer 27 essentially comprising catalyst elements properly so called, such as platinum and ruthenium, and electrical and ionic conducting elements such as carbon and the same material as that which constitutes membrane 26.

Figure 3:
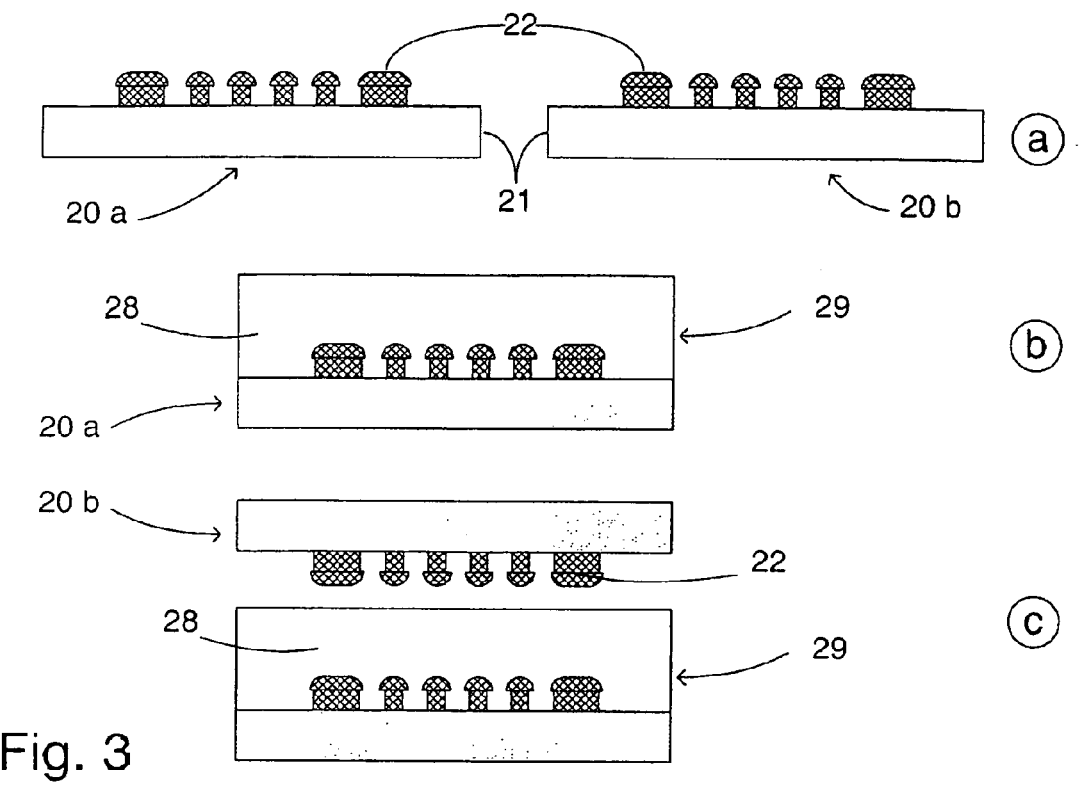
Figure 3:
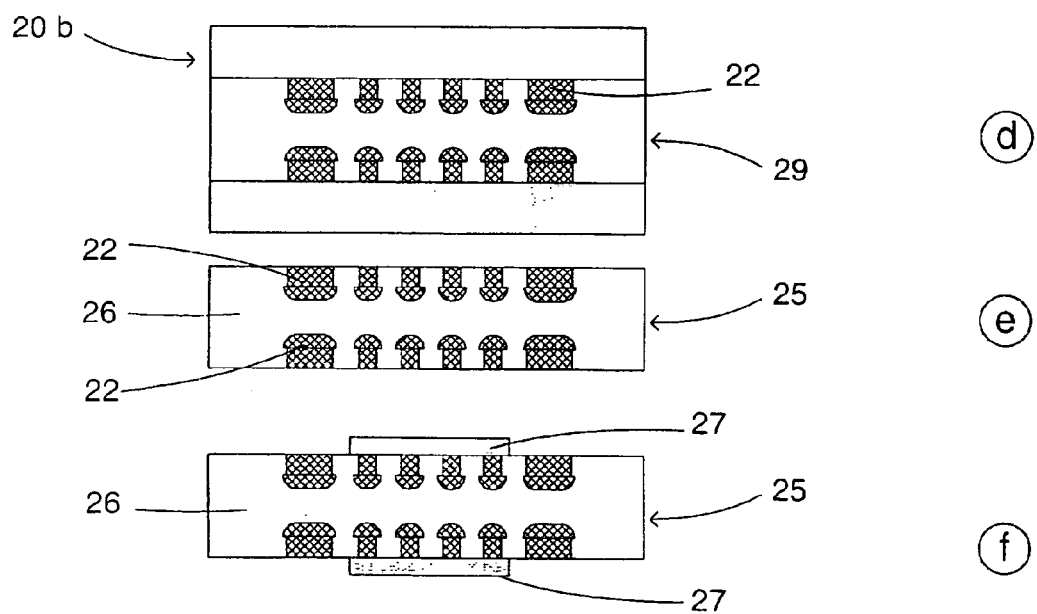

A variant of this method is illustrated in FIG. 3 on which the elements identical to those in FIG. 2 carry the same reference numbers.

FIG. 3a

The first operation is identical to that of FIG. 2a.

FIG. 3b

A polymerizable ionic membrane 28 of the same type as semi-membranes 23, but with a double thickness, is deposited in a liquid or pasty state on assembly 20a in order to constitute subassembly 29.

FIG. 3c

After prepolymerization of membrane 28, an operation that is not indispensable, assemblies 20b and 29 may be fixed respectively onto the work plates of a "flip chip bonding" machine, membrane 28 facing collector 22 of assembly 20b.

FIG. 3d

The alignment and flatness of assemblies 20b and 29 having been adjusted, they may be applied against each other by the machine under pressure at a temperature and for a duration such that collector 22 of assembly 20b may be inlaid in the membrane which solidifies by polymerization.

FIG. 3e

The operation is identical to that of FIG. 2e.

FIG. 3f

The operation is identical to that of FIG. 2f.

Whatever the method used, the structure obtained may suffer from the fact that thin membrane 26 risks being deformed under the action of moisture, which may present a problem when the assembly has to be handled in order to incorporate it in a fuel cell.

Figure 1:
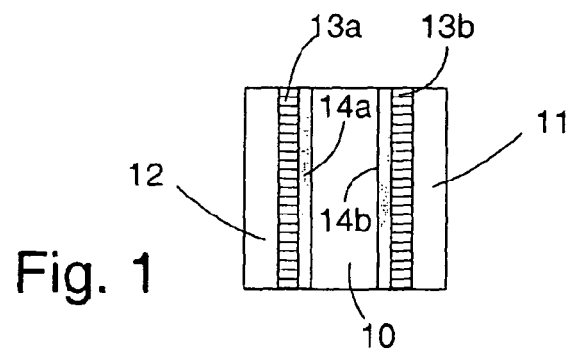
FIG. 1 shows diagrammatically a fuel cell as described in document FR 03 07 967.
Figure 4:
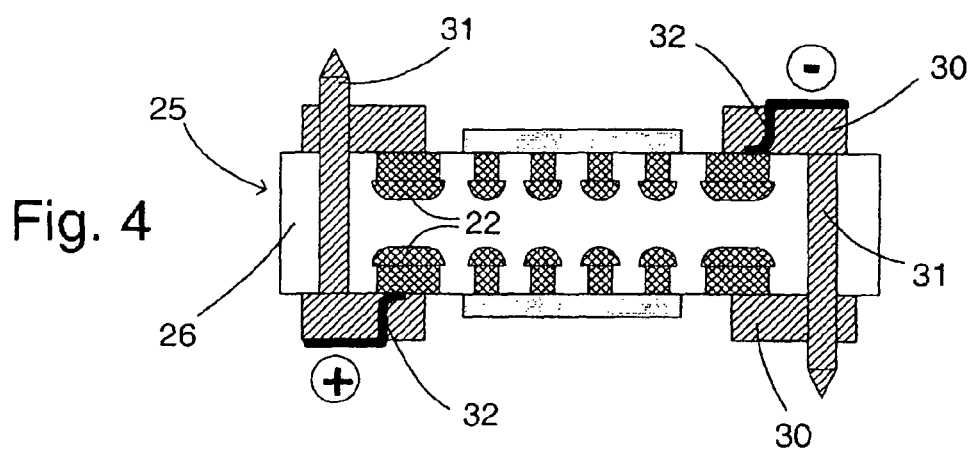
FIG. 4 shows the incorporation of the cell core between two frames.

According to the invention, as illustrated in FIG. 4, the above problem may be solved by inserting assembly 25 between two rigid frames 30, which may advantageously be made of PVC and fixed to each other with the aid of points 31 passing through membrane 26. It will be noted that these frames may also serve as supports for electrical contacts 32 connecting two collectors 22 to the outside.

This "packaging" of the assembly, in the manner of a transparency, makes it possible to stabilize the shape of the membrane and makes it easier to handle.

Figure 5:
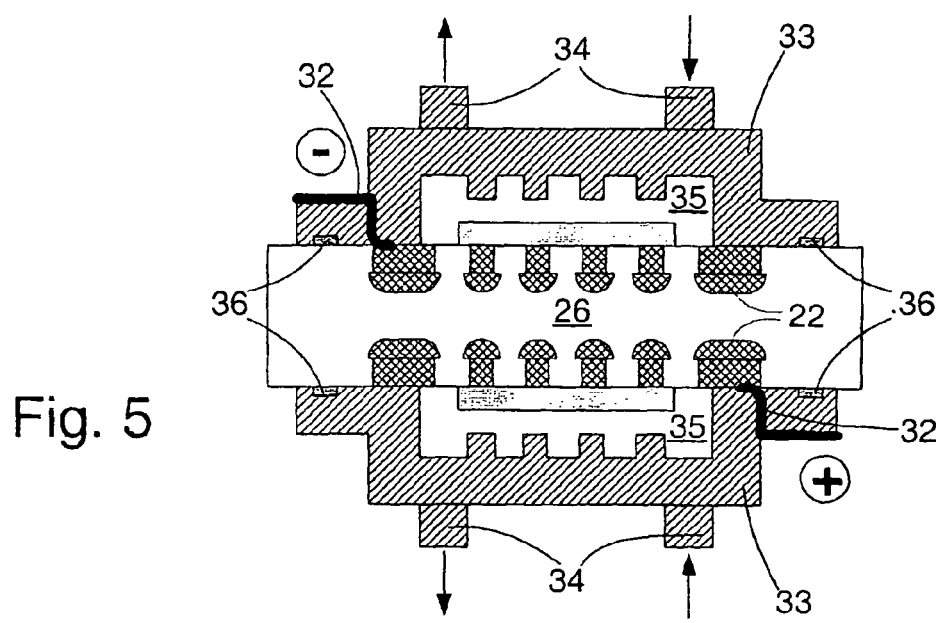
FIG. 5 shows the incorporation of the cell core between two covers.

Finally, reference will be made to FIG. 5 showing that simple frames 30 of FIG. 4 are replaced by rigid covers 33, which may advantageously be made of PVC and also fixed to each other by points (not shown). These covers may be provided with connecting end pieces 34 which also ensure stiffening of the assembly but moreover provide, either side of catalysts 27, spaces 35 for the necessary reagents. Seals 36 ensure the leakproofness of these spaces. The structure of FIG. 5 thus constitutes a complete fuel cell.

The present invention has been described with reference to isolated assemblies. In practice, as is conventional in the field of microelectronics, several assemblies provided with their frames or covers may be produced by forming a single membrane on a matrix of collectors. The assemblies may finally be separated by cutting the membrane around the frames or covers.

It is therefore proposed to produce a miniature fuel cell core which, by virtue of the integration of current collectors into the membrane, greatly improves the membrane-collectors-catalysts contact and, by virtue of the use of frames, makes it possible to prevent deformations of the membranes without excessive supplementary costs. The invention also makes it possible, by virtue of the use of covers, to provide a ready-to-operate miniature fuel cell. Finally, it will be noted that the harpoon shape of the current collectors appreciably reinforces their strength in the membrane.

The invention claimed is:

1. A method for producing a fuel cell core, comprising the following operations in sequence:
    providing two substantially identical subassemblies each formed of a substrate and a current collector positioned on it in a detachable manner,
    depositing a polymerizable ionic membrane in a liquid or pasty state on at least one of said subassemblies so as to cover its collector completely,
    applying said two subassemblies one against the other so as to obtain an assembly comprising a solidified membrane with said two collectors incorporated, face to face, in said membrane, and
    detaching said two substrates from said collectors.

2. The method according to claim 1, wherein said collectors are formed in situ on said substrates.

3. The method according to claim 1, wherein said collectors are formed separately and then added to said substrates.

4. The method according to claim 1, wherein said membrane is deposited on said two subassemblies.

5. The method according to claim 1, wherein said membrane is deposited on only one of said two subassemblies.

6. The method according to claim 1, further including, after said substrates are detached, an operation of depositing a catalyst layer on said collectors.

7. The method according to claim 2, further including, after said substrates are detached, an operation of depositing a catalyst layer on said collectors.

8. The method according to claim 3, further including, after said substrates are detached, an operation of depositing a catalyst layer on said collectors.

9. The method according to claim 4, further including, after said substrates are detached, an operation of depositing a catalyst layer on said collectors.

10. The method according to claim 5, further including, after said substrates are detached, an operation of depositing a catalyst layer on said collectors.

* * * * *